United States Patent
Mihaly et al.

(10) Patent No.: US 8,717,902 B2
(45) Date of Patent: May 6, 2014

(54) METHOD AND APPARATUS FOR REDUCING TRAFFIC IN A COMMUNICATIONS NETWORK

(75) Inventors: Attila Mihaly, Dunakeszi (HU); András Csàszàr, Budapest (HU); Zoltan Lajos Kis, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 77 days.

(21) Appl. No.: 13/263,116

(22) PCT Filed: Apr. 15, 2009

(86) PCT No.: PCT/EP2009/054478
§ 371 (c)(1),
(2), (4) Date: Dec. 20, 2011

(87) PCT Pub. No.: WO2010/118774
PCT Pub. Date: Oct. 21, 2010

(65) Prior Publication Data
US 2012/0092997 A1 Apr. 19, 2012

(51) Int. Cl.
*G01R 31/08* (2006.01)
(52) U.S. Cl.
USPC ............. 370/237; 370/229; 455/410
(58) Field of Classification Search
None
See application file for complete search history.

(56) References Cited

U.S. PATENT DOCUMENTS

| 6,542,964 | B1 | 4/2003 | Scharber |
| 2002/0133621 | A1 | 9/2002 | Marco et al. |

(Continued)

FOREIGN PATENT DOCUMENTS

| WO | 00/74347 A1 | 12/2000 |
| WO | 02/31615 A2 | 4/2002 |
| WO | 03/088065 A1 | 10/2003 |

(Continued)

OTHER PUBLICATIONS

Hefeeda et al, "Cooperative Caching: The Case for P2P Traffic", Proceedings 33$^{rd}$ IEEE Conference on Local Computer Networks, Oct. 17, 2008, pp. 12-18.
International Search Report for PCT/EP2009/054478, mailed Feb. 12, 2010.
Written Opinion for PCT/EP2009/054478, mailed Feb. 12, 2010.

*Primary Examiner* — Ricky Ngo
*Assistant Examiner* — Iqbal Zaidi
(74) *Attorney, Agent, or Firm* — Nixon & Vanderhye, P.C.

(57) ABSTRACT

A method is provided of reducing traffic in or relating to a service provider network. The service provider network comprises a core packet network, a plurality of first access points (6) off the core network to an external packet network (7), and a plurality of second access points (4) off the core network to local subscribers. A cache (T1, T2) is provided at each of the access points (6, 4) for caching content passing through. In response to a request received from the external network (7) at any of the first access points (6) for content from a local subscriber, it is attempted to serve the request from content previously cached at that first access point (6) or another of the first access points (6). If unable to serve the request from any of the first access point caches (T1), it is attempted to serve the request from content previously cached at the second access point (4) serving the local subscriber. If unable to serve the request from that second access point cache (T2) then the request is forwarded to the local subscriber.

17 Claims, 7 Drawing Sheets

(56) References Cited

U.S. PATENT DOCUMENTS

| | | |
|---|---|---|
| 2007/0055764 A1 | 3/2007 | Dilley et al. |
| 2007/0198726 A1 | 8/2007 | Marco et al. |
| 2008/0222281 A1 | 9/2008 | Dilley et al. |
| 2008/0285577 A1* | 11/2008 | Zisapel et al. ............... 370/409 |
| 2010/0115588 A1* | 5/2010 | Johannesson et al. ............ 726/4 |

FOREIGN PATENT DOCUMENTS

| WO | 2005/079020 A1 | 8/2005 | |
|---|---|---|---|
| WO | WO2005079020 * | 8/2005 | .............. H04L 12/56 |

* cited by examiner

Tier 2 cache:
Request from
Tier 1 cache

METHOD AND APPARATUS FOR REDUCING TRAFFIC IN A COMMUNICATIONS NETWORK

This application is the U.S. national phase of International Application No. PCT/EP2009/054478 filed 15 Apr. 2009 which designated the U.S., the entire contents of which is hereby incorporated by reference.

TECHNICAL FIELD

The present invention relates to a method and apparatus for reducing traffic in a communications network, and is particularly but not exclusively applicable to network operators such as Internet Service Providers (ISPs).

BACKGROUND

Internet access is a simple service, generally relying on flat rate billing model, i.e. subscribers are allowed to send and receive an unlimited amount of traffic for a fixed monthly fee. In return subscribers get a best-effort service only, i.e. the Service Level Agreement (SLA) defines the maximum access bandwidth only with no guarantees for the subscribers.

The most common Internet application contributing to excessive usage on the Internet today is file-sharing, most often implemented in a peer-to-peer system. Peer-to-peer (P2P) file-sharing applications allow users on the Internet to access files located on arbitrary computers participating in the file-sharing network. Some of the more common file-sharing programs are BitTorrent, KaZaa, Gnutella, eDonkey, eMule, Fasttrack and Morpheus.

Peer-to-peer file-sharing traffic now accounts for between 65 and 80 percent of the global Internet traffic. This traffic is mostly generated by so-called "power-users", who generally represent a small percentage of the subscribers. Managing the peer-to-peer traffic generated by power users is a significant issue for operators. The available bandwidth per user decreases in case many subscribers use such file-sharing applications. This results in poor overall broadband service and in increased costs due to increased help-desk calls, subscriber turnover, and high peering costs. When most of the peer-to-peer content resides outside of their network boundaries, operators quickly find themselves losing money when their subscribers download content from remote operators across transit networks.

Moreover, these P2P file-sharing networks function properly only if all participating users share content for other participants. In other words, users must upload as much as download. As a result, a subscribers participating in a P2P file sharing network generate upload traffic proportional to their download traffic (while in the case of regular Internet users the upload traffic is magnitudes lower than download traffic).

There are two main approaches to reducing the overall traffic generated by peer-to-peer file-sharing applications: traffic engineering and content caching.

With traffic engineering, operators install dedicated equipment on peer edge routers and access edge routers. These devices are capable of monitoring flows generated by peer-to-peer users and intervene if necessary. Intervention can either be traffic shaping (e.g. reducing overall bandwidth of the flow), remarking or complete blocking of the flow. This is a viable solution and is in fact used by many fixed operators today. However, this solution is uncooperative from the subscribers' point of view and must be preceded by unattractive service specifications, e.g. traffic 'buckets'. In the long run, subscribers are likely to part from the operator as their file sharing needs are not fulfilled as expected.

Caching is also done by installing dedicated equipment: cache servers inside the core network, and traffic redirectors on edge routers. Traffic redirectors detect both peer-to-peer requests and transfers, and redirect them through the cache server. If the cache server contains the requested content, the content is served to the subscriber from the cache instead of the original source beyond edge routers. If the content is not cached, the request is fulfilled by the original source, and the cache server stores a copy of the incoming content. Caching can be done transparently—where subscribers do not know of the cache servers—and cooperatively—where subscribers willingly use the operator's cache servers as this is beneficial for the subscribers too (because of lower end-to-end latency and better throughput).

There are existing caching solutions (see e.g. US 2002/0133621, WO 02/31615, EP-A-1714437 and WO 2005/079020) that can be implemented within ISP networks. The primary aim of these solutions is to reduce both inbound and outbound peer-to-peer traffic at the edge routers. The motivation is that transit peering represents the highest transmission-related OPEX (operating expense) for most of existing Tier-2 or Tier-3 ISPs. These operators generally own their access and core transport infrastructure.

These solutions place a cache server (or cache cluster) into the core network and serve outgoing peer-to-peer requests from the cache server if possible. Also incoming peer-to-peer requests are served by these servers thus unburdening limited upload bandwidth of subscribers, and access networks in general.

Akamai (www.akamai.com) provides a well-known service for mirroring and caching server content. Akamai works by resolving the DNS name of customer content to an IP address of an Akamai server. The Akamai server is automatically picked depending on the type of content and the user's network location, thus it provides load distribution for the network and for the servers (i.e. the customer does not need many high capacity servers).

The approach of Akamai is not suitable for P2P file sharing applications as it relies on DNS resolution. However, the distributed overlay of P2P systems directly gives back the peer's IP address where the content can be found. So, instead of DNS, the P2P overlay itself resolves content queries to peers. As there is no DNS query during content search, Akamai has no chance to intervene.

The high traffic levels generated by subscribers, in particular those operating file-sharing services, place a severe technical demand on operators, and it is desirable to provide workable solutions. This is particularly the case for where there is a high cost associated with carrying the Internet traffic generated by the subscribers, such as for SAE/LTE (System Architecture Evolution/Long Term Evolution) and FMC (Fixed Mobile Convergence) operators.

SUMMARY

According to a first aspect of the present invention there is provided a method of reducing traffic relating to a service provider network comprising a core packet network, a plurality of first access points off the core network to an external packet network, and a plurality of second access points off the core network to local subscribers, the method comprising: providing a cache at each of the access points for caching content passing through, and, in response to a request received from the external network at any of the first access points for content from a local subscriber, attempting to serve the request from content previously cached at that first access point or another of the first access points, and if unable to serve the request from any of the first access point caches then attempting to serve the request from content previously cached at the second access point serving the local subscriber, and if unable to serve the request from that second access point cache then forwarding the request to the local subscriber.

In response to a request for content received from a local subscriber at the second access point serving the local subscriber, the method may comprise attempting to serve the request from content previously cached at that second access point or, in the case of the request being for content from another local subscriber, from content previously cached at the second access point serving the other local subscriber, and if unable to serve the request from a second access point cache then attempting to serve the request from content previously cached at one of the first access points, and if unable to serve the request from a first access point cache then forwarding the request towards the provider of the content.

According to a second aspect of the present invention there is provided a method of reducing traffic relating to a service provider network comprising a core packet network, a plurality of first access points off the core network to an external packet network, and a plurality of second access points off the core network to local subscribers, the method comprising: providing a cache at each of the access points for caching content passing through, and, in response to a request for content received from a local subscriber at the second access point serving the local subscriber, attempting to serve the request from content previously cached at that second access point or, in the case of the request being for content from another local subscriber, from content previously cached at the second access point serving the other local subscriber, and if unable to serve the request from a second access point cache then attempting to serve the request from content previously cached at one of the first access points, and if unable to serve the request from a first access point cache then forwarding the request towards the provider of the content.

The caches may be provided as part of their respective associated access points, or could be provided separately and linked to their respective associated access points, for example by zero-cost links.

Each second access point cache may be associated with one of the first access point caches, such that a request received at a second access point cache that is unable to be served by that or another second access point cache is attempted to be served from content previously cached at its associated first access point cache.

The method may comprise using a tunnel over the core network to forward requests for content between the first and second access point caches.

The method may comprise maintaining a record of popularity for various content, arranging for content within a first predetermined range of popularity to be distributed to the first and second access point caches, arranging for content within a second predetermined range of popularity lower than the first predetermined range to be distributed to at least to the first access point caches, and arranging for content within a third predetermined range of popularity lower than the second predetermined range to be distributed to at least one first access point cache.

The method may comprise deciding whether or not to cache content or whether or for how long to maintain content in a cache in dependence upon the measure of popularity.

The first access point caches may form a distributed cache system, with cached content being shared or searchable across the cache system.

The first access points may be edge routers and the second access points may be access edge routers.

The core packet network may be a layer 3 packet network, and the second access points may provide layer 2 connectivity access into the core network.

The service provider network comprises a mobile network.

According to a third aspect of the present invention there is provided a system for reducing traffic relating to a service provider network, the network comprising a core packet network, a plurality of first access points off the core network to an external packet network, and a plurality of second access points off the core network to local subscribers, and the system comprising a cache at each of the access points for caching content passing through, and means for, in response to a request received from the external network at any of the first access points for content from a local subscriber, attempting to serve the request from content previously cached at that first access point or another of the first access points, and if unable to serve the request from any of the first access point caches then attempting to serve the request from content previously cached at the second access point serving the local subscriber, and if unable to serve the request from that second access point cache then forwarding the request to the local subscriber.

According to a fourth aspect of the present invention there is provided a system for reducing traffic relating to a service provider network, the network comprising a core packet network, a plurality of first access points off the core network to an external packet network, and a plurality of second access points off the core network to local subscribers, and the system comprising a cache at each of the access points for caching content passing through, and means for, in response to a request for content received from a local subscriber at the second access point serving the local subscriber, attempting to serve the request from content previously cached at that second access point or, in the case of the request being for content from another local subscriber, from content previously cached at the second access point serving the other local subscriber, and if unable to serve the request from a second access point cache then attempting to serve the request from content previously cached at one of the first access points, and if unable to serve the request from a first access point cache then forwarding the request towards the provider of the content.

According to a fifth aspect of the present invention there is provided an apparatus for reducing traffic relating to a service provider network, the network comprising a core packet network, a plurality of first access points off the core network to an external packet network, and a plurality of second access points off the core network to local subscribers, there being provided a cache at each of the access points for caching content passing through, the apparatus being for use at one of the first access points and comprising means for receiving a request from the external network for content from a local subscriber, attempting to serve the request from content previously cached at the first access point or another of the first access points, and if unable to serve the request from any of the first access point caches then arranging for the request to be served from content previously cached at the second access point serving the local subscriber.

According to a sixth aspect of the present invention there is provided an apparatus for reducing traffic relating to a service provider network, the network comprising a core packet network, a plurality of first access points off the core network to an external packet network, and a plurality of second access points off the core network to local subscribers, there being provided a cache at each of the access points for caching content passing through, the apparatus being for use at one of the second access points and comprising means for receiving a request for content received from a local subscriber, attempting to serve the request from content previously cached at the second access point or, in the case of the request being for content from another local subscriber, from content previously cached at the second access point serving the other local subscriber, and if unable to serve the request from a second access point cache then arranging for the request to be served from content previously cached at one of the first access points.

According to a seventh aspect of the present invention there is provided a program for controlling an apparatus to perform a method according to the first or second aspect of the present invention or which, when loaded into an apparatus, causes the apparatus to become a system or an apparatus according to the third, fourth, fifth or sixth aspect of the present invention. The program may be carried on a carrier medium. The carrier medium may be a storage medium. The carrier medium may be a transmission medium.

According to an eighth aspect of the present invention there is provided an apparatus programmed by a program according to the seventh aspect of the present invention.

According to a ninth aspect of the present invention there is provided a storage medium containing a program according to the seventh aspect of the present invention.

An embodiment of the present invention has an advantage associated with it in addressing an issue mentioned above; further advantages are set out below.

DETAILED DESCRIPTION

Figure 1:
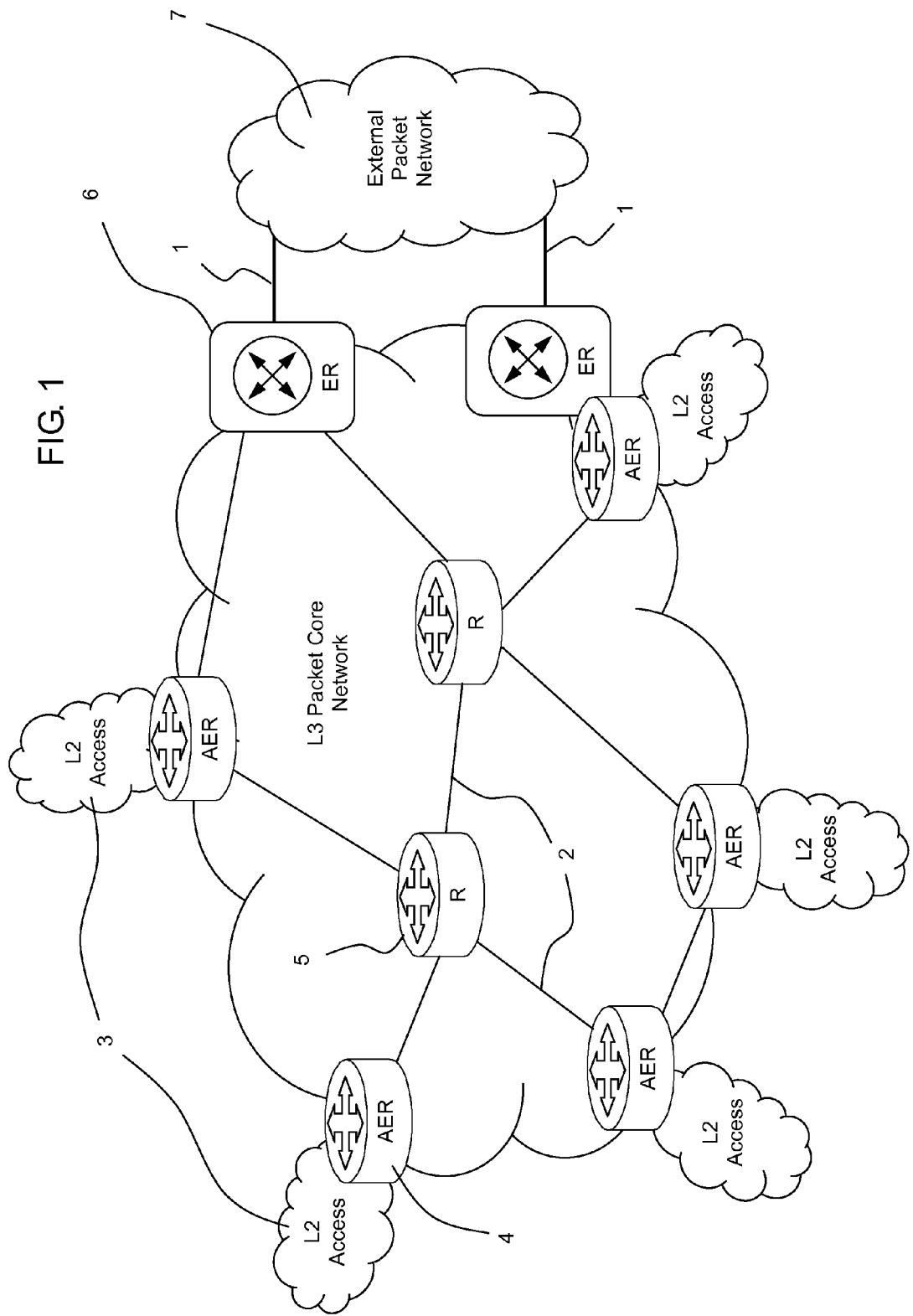
FIG. 1 is a schematic view of a service provider's network topology.

It has been explained above that there are two main approaches to reducing the overall traffic generated by peer-to-peer file-sharing applications: traffic engineering and content caching. Of these two approaches, the present applicant considers that caching is a superior solution to traffic engineering as it does not have a negative effect on user experience, while installation, operation and maintenance costs of the two solutions are marginally the same. Therefore most ISPs choose the caching solution to handle the P2P file-sharing issue.

Analysis by the present applicant has led to an appreciation that, while the above-described caching solution is viable in current ISP networks, it is not suited for future fixed or mobile networks, because of the following differences in these networks' topology and cost structures:

ISP network topologies are concentrated within relatively small geographical regions around larger towns with only a few edge routers, so transport delays to and from cache servers co-sited with these edge routers are negligible; LTE/SAE or FMC networks will span over larger territories with possibly numerous edge routers peering traffic to data networks, thus end-to-end delays must also be taken into consideration.

Current ISP access networks are provisioned for fixed upload/download bandwidths in the first mile. This is because the existing infrastructure of legacy telecom operators based on fibre or copper can be used (ISPs that do not own this infrastructure may rent this fixed access bandwidth within the so-called wholesale model). In contrast, mobile networks like LTE/SAE have to build or rent their own transport infrastructure for the access (Radio Access Network or RAN) and this has to cover large geographical areas to allow subscriber mobility. Therefore the cost for the access transmission—either owned or rented—represents a significant share of the overall cost. To save access cost, mobile operators try to carefully dimension their transport with sophisticated methods that take into account the limited capacity of the shared radio resources and some desired experienced quality by the subscribers. Any solution that could save on these bandwidths without affecting subscriber experience would be welcome.

While ISP operators usually own the core transmission equipments and links, current 2G/3G/CDMA2000 mobile operators generally rent transmission from other operators, and it is expected that at least some of these operators may evolve to LTE/SAE by keeping the same rented core transport infrastructure. Therefore, while core network transfer costs are negligible for ISP operators, they may represent a factor to be reduced within future LTE/SAE networks.

ISPs may have very few nodes where they peer to other operators and providers. These edge routers, being concentrated on a geographical location, allow the placement of a central cache near all edge routers. SAE/LTE operators, on the other hand, are expected to set up PDN-GWs (PDN is Packet Data Network, while GW is Gateway) at many different locations, where they may also peer to Internet operators. These edge routers are geographically distributed, therefore a single cache cannot be used to serve all edge routers efficiently (i.e. with minimal transport costs).

While the peer-to-peer traffic is predominantly external today (i.e., passing through edge routers to external networks), this may change in the future if new provider-specific applications or topology-aware protocols are developed. This would direct considerable part of the peer-to-peer traffic to internal links.

FIG. 1 is a schematic view of a service provider's typical network topology, comprising a plurality of Access Edge Routers (AERs) 4, separating the L2 connectivity network from the L3 packet core network, a plurality of Edge Routers (ERs) 6 peering with other packet networks 7, and a plurality of internal routers (R) 5.

The typical areas where traffic reduction may be required the service provider's topology are: peering links 1 at the ERs 6, core links 2, and access links 3 at the AERs 4, these links being illustrated in FIG. 1. In comparison, on a typical ISP network, currently only the traffic at the peering points would be a real issue.

An embodiment of the present invention provides a method and architecture for optimal content caching within large area service provider networks. The proposed architecture allows reducing all important cost components of the operator related to Internet traffic as described above.

Figure 2:
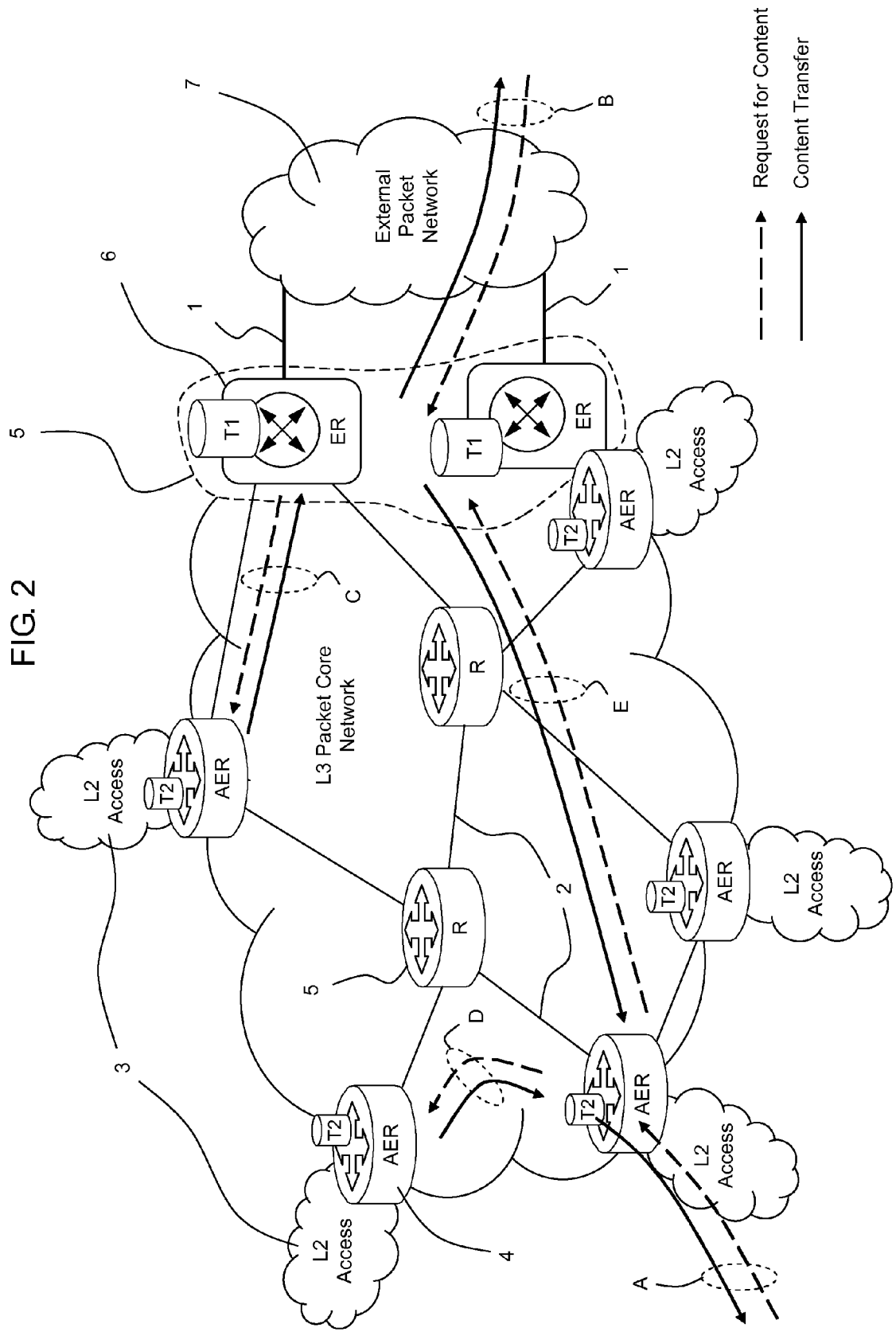
FIG. 2 is a schematic illustration of a two-tier cache architecture according to an embodiment of the present invention, with typical placement of caches and content request scenarios.

A two-tier caching solution, involving first and second tier caches T1, T2, is proposed in an embodiment of the present invention. FIG. 2 schematically illustrates the placement of the first tier and second tier caches T1, T2 in a typical network. FIG. 2 also shows the typical content request scenarios: request to and from internal and external sources. A request for internal content from an external host is also referred to herein as an inbound request, while a request for external content from an internal host is also referred to herein as an outbound request.

The first tier of caches T1 is typically placed on the sites with peering points (ERs of FIG. 2). These caches act as a distributed caching solution, able to efficiently distribute and replicate content among each other, thus implementing load sharing, scalability and resilience. The primary aim of these caches is to reduce traffic to and from external destinations at edge routers. The distributed cache system is represented in FIG. 2 by reference 5.

The second tier of caches T2 is typically placed on sites deploying edge nodes for the L2 access, acting as the IP point-of-presence for subscribers (AERs of FIG. 2). The primary aim of the second tier caches T2 is to reduce overall traffic in core and access links.

To spare with core and access network transmission costs, content requests from external hosts to local subscribers are directed to, and attempted to be served by the first-tier distributed cache system 5 or the second-tier cache T2 of the subscriber. If content is not available in either caches then the request is forwarded to the destination.

If an internal or external content requested by a local subscriber is available on the local second-tier cache T2 this cache fulfils the request. If not, the external request (i.e. the request for external content from an internal host) is redirected to the distributed first tier caches T1 while the internal request (i.e. the request for internal content from an internal host) is forwarded towards the destination. In the latter case the second-tier cache T2 at the remote edge also attempts to serve the request before it reaches the destination.

For any content flowing through the first and second-tier caches T1, T2—either inbound or outbound—the cache stores a copy of the content. The caches may apply decision logic for content storage decision and timeout for the different content to limit the amount of content stored. This logic may depend on the direction of the request (inbound or outbound) source or destination IP address range, popularity of the content etc.

The second-tier caches T2 can be much simpler (and therefore cheaper) than first-tier caches T1. The size of the cache can be smaller as it is only responsible for its own access network. Moreover, it does not need to have a sophisticated algorithm to search for content; it neither needs signalling protocols to communicate with first-tier or other second-tier caches. Searching between caches is only done at the first-tier level. First-tier caches T1 are assumed to have higher capacity storage as well. The reason is to have a low-cost alternative to highly-distributed first-tier system 5. Second-tier caches T2 are imagined to be implementable features in the AERs.

In more detail, the proposed solution the first-tier caches T1 are typically installed on sites with in/outbound edge routers of the operator's network. These caches act as a distributed content caching system 5: they are able to transfer content to another cache, as well as search and pull content from other caches. The search function can be implemented in a client server manner, or using distributed search algorithms. In the former case a dedicated meta-information server is installed. This server stores a database of the contents available on either first-tier cache, mapping content identifiers to the addresses of the caches storing the content. Every time a cache stores new content, or erases existing content, it updates the database within the meta server. Similarly, on every search, the meta server is contacted for the address of caches possessing the queried content.

In the latter case the first-tier caches T1 are organized into an overlay network, and apply a peer-to-peer search scheme when searching for a given content. The overlay can be either unstructured or structured. In an unstructured network each cache stores its own meta-information, and searches are done by limited flooding. In a structured network pieces of meta-information are mapped onto specific caches (e.g. by using a hash function), and a routing algorithm is applied during searches. The former solution generates more traffic, while being more robust; but in the case of typical provider networks the structured overlay solution is more optimal.

The first-tier caches T1 are able to detect file requests and content transfers, as well as to intercept and serve such requests. If an inbound or outbound content is routed through a first-tier cache T1, it decides whether to store the content in its local storage so the content becomes available for the distributed cache for later use. Optionally the cache might also decide to push the content to another first-tier cache T1.

The steps performed by a first-tier cache T1 according to an embodiment of the present invention will now be explained in more detail with reference to FIG. 3.

Starting from an idle state in step S1, an inbound file request—destined to an end user of the network—is routed through a first-tier cache T1, the cache intercepts the request in step S2. If the content is found in the cache's local store in step S3, the cache fulfils the intercepted request in step S4, thus saving core and access traffic costs (i.e. links 2 and 3 of FIG. 2).

If the content is found not to be available in the local store at step S3, the cache initiates in step S5 a distributed search among the other first-tier caches T1 of the distributed cache system 5. If the content is found in any cache in step S6, the content is pulled in step S8 and mirrored on the original first-tier cache T1 in step S9. The cache answers the request in step S4, and by doing so saving on access network traffic costs (i.e. links 3 of FIG. 2).

Figure 3:
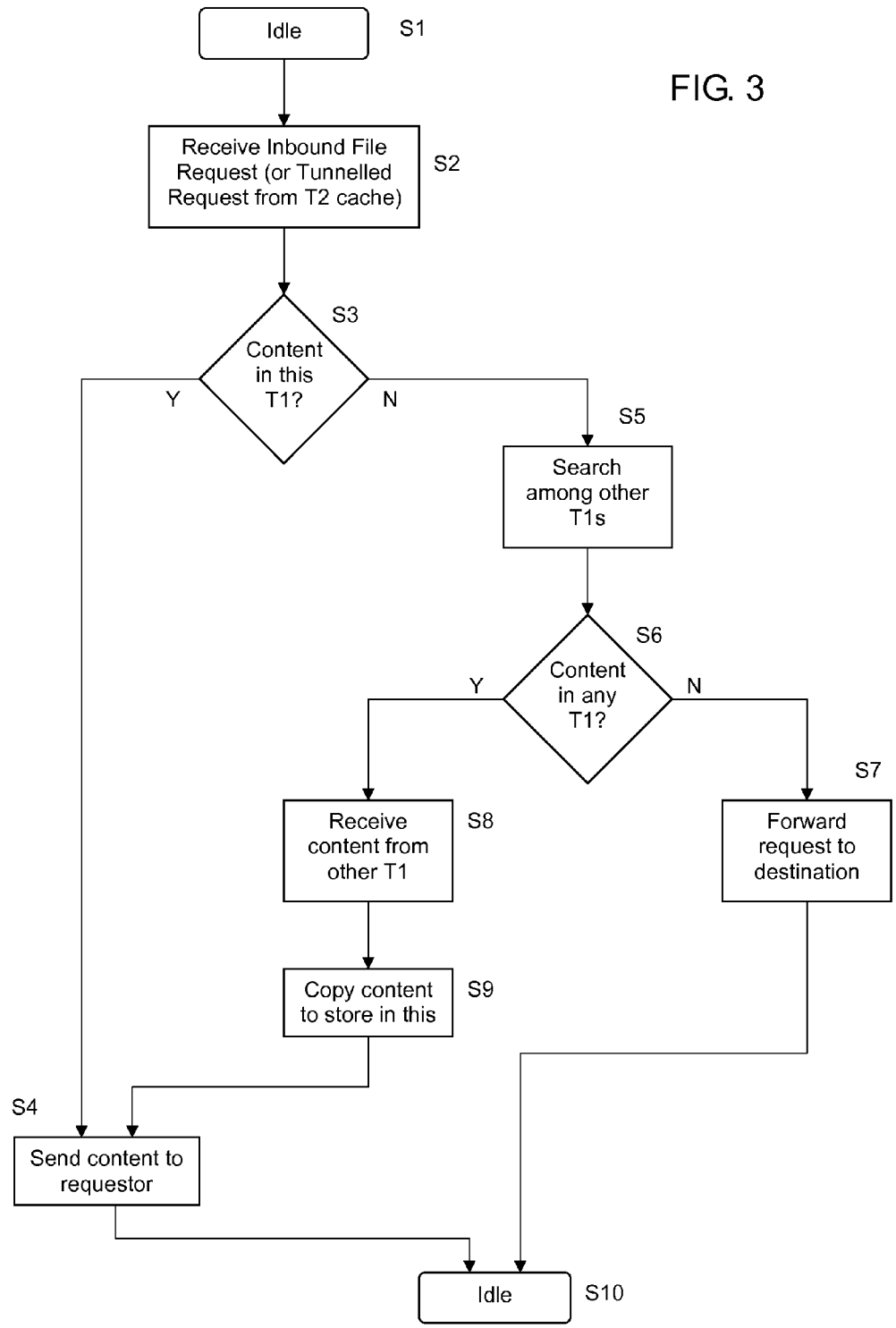
FIG. 3 is a schematic flowchart illustrating the functions performed by a first-tier cache in an embodiment of the present invention.

In the two cases described so far with reference to FIG. 3, passing through step S4, the content can be served by the first-tier cache T1.

Figure 4:
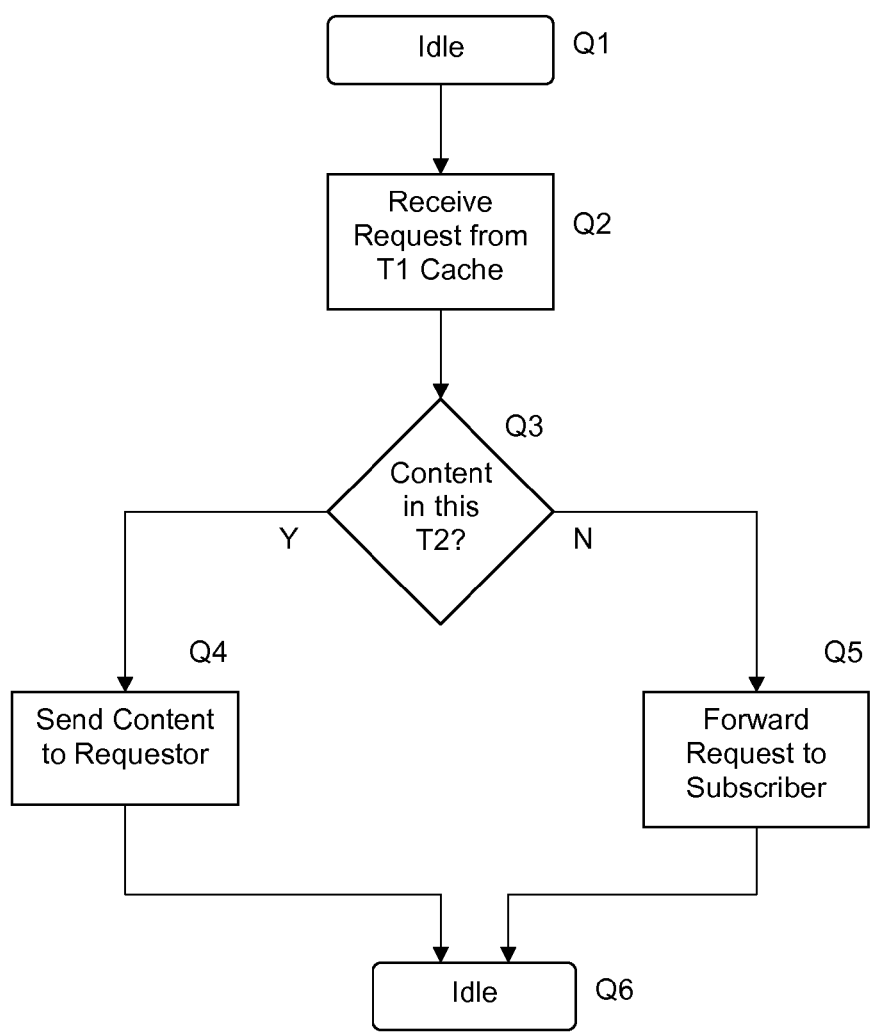
FIG. 4 is a schematic flowchart illustrating the functions performed by a second-tier cache in an embodiment of the present invention in the case of incoming requests from a first-tier cache.

If the content is not found in the distributed first-tier cache system 5 in step S6, the intercepted request is routed onward towards the second-tier cache T2 of the subscriber in step S7, and received at the second-tier cache in step Q2 of FIG. 4, from an idle state of the second-tier cache T2 in step Q1. If the content is found in the second-tier cache T2 in step Q3, the content is sent to the requestor (the first-tier cache T1) in step Q4. The content is cached by the distributed first-tier cache system 5 as it is routed through the ERs. If the content is not found in either the first-tier or the second-tier cache (this would be determined in step Q3 of FIG. 4), it will be served by the destination following forwarding of the request to the subscriber in step Q5 of FIG. 4, and is cached by the second-tier cache T2 and also by first-tier caches T1 once passing through an outbound edge router.

In all cases above, the first-tier cache T1 returns to an idle state in step S10, awaiting the next incoming file request, and the second-tier cache T2 returns to an idle state in step Q6.

Apart from inbound file requests received by the first-tier caches T1 as described above with reference to FIG. 3, first-tier caches T1 are also able to receive file requests in step S1 via tunnels from the second-tier caches T2 (in the case of outbound file requests received at the second-tier caches T2 from subscribers, with those requests not being served by the second-tier caches T2). Requests arriving via tunnels are handled in much the same way as inbound file requests. Each second-tier cache T2 is logically bounded to a nearby first-tier cache T1 using one of these tunnels, so they can forward unmodified requests to first-tier caches T1. In the case of a first-tier cache T1 handling a file request in step S1 via a tunnel from a second-tier cache T2, step S7 (content not found in first-tier cache T1) would involve notifying the second-tier cache T2 of this.

Figure 5:
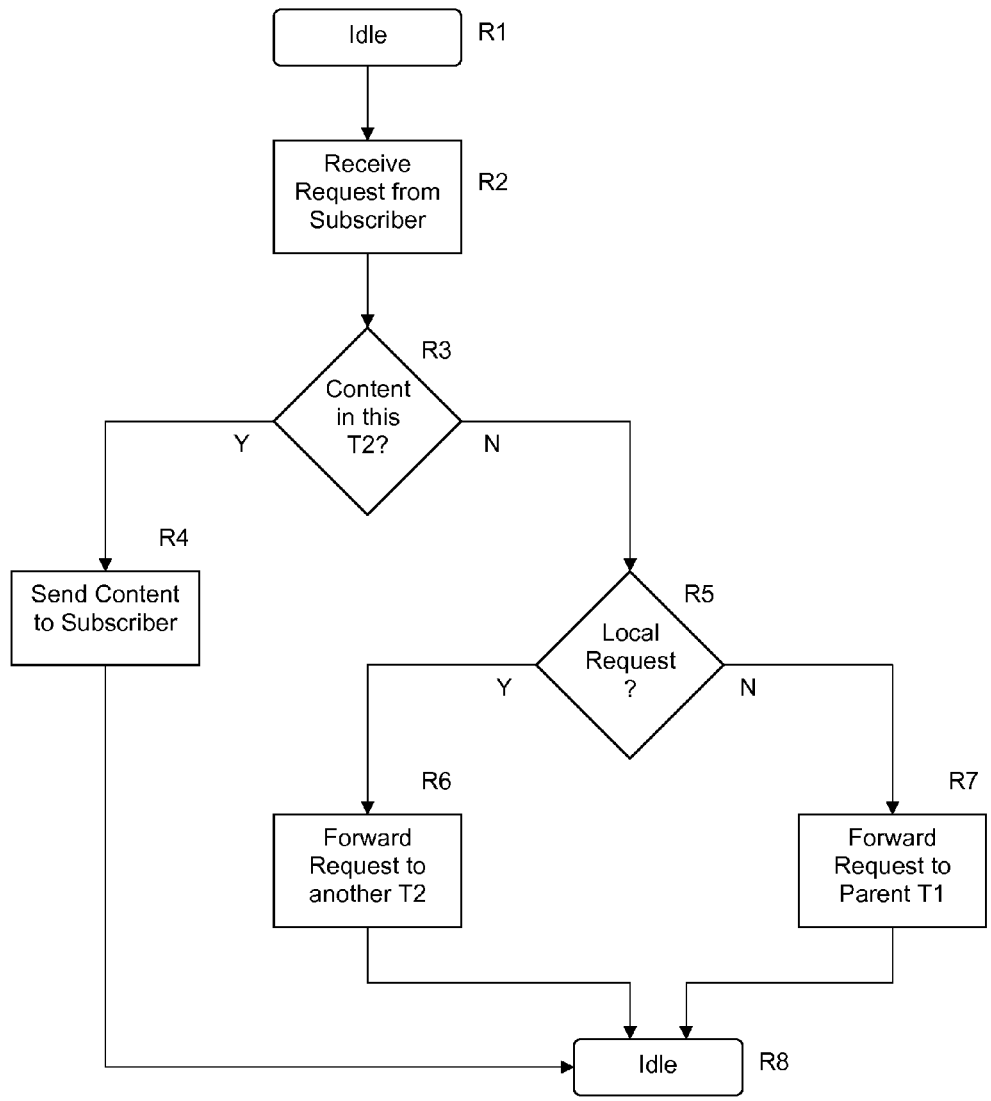
FIG. 5 is a schematic flowchart illustrating the functions performed by a second-tier cache in an embodiment of the present invention in the case of outgoing requests from a subscriber.

Second-tier caches T2 are placed on closer points to the layer-2 access on the network topology, typically on AERs. Second-tier caches T2 use the distributed first-tier cache system 5 in a client-server manner, using the previously mentioned tunnels. Referring now to FIG. 5, the second-tier caches T2 intercept requests in step R2 originating in the connecting access networks, from an idle state in step R1. If the requested content is determined in step R3 as being stored in the cache, it serves the requestor in step R4, thus saving core network traffic and either peering or access traffic (for external and internal requests). If the requested content is not available, the request is forwarded to the first-tier cache system 5 (step R7) in the case of an external request, or to the second-tier cache T2 of the local subscriber (step R6) in the case of a local request; determination of whether the request is external or local is determined in step R5. In the simplest case, the forwarding to a first-tier cache T1 may be achieved by a predefined tunnel between the second-tier cache T2 and the first-tier cache T1. The tunnel may be any type of IP tunnel. The encapsulated IP packet may even be sent to an anycast address in order to take distance in the topology into account and forward the request to a close first-tier cache T1. The advantage of this solution is that it does not imply any signalling between the two tiers of caches.

From this point the request is handled as described above: if the content is found in the parent first-tier cache T1, it serves the content; otherwise the request is routed to its destination. Eventually, when the request is fulfilled, the content will be routed through the original second-tier cache, so it will have the opportunity to cache the content for later serving. (The content will be also stored in the first-tier distributed cache—as described above—so it can serve other second-tier caches with this content as well).

Second-tier caches T2 also cache outbound content. This feature saves access network costs (i.e. links 3 on FIG. 2), when the request originated from another user of the operator's network (as the content of such requests will not be routed through any of the first-tier caches). This feature also saves bandwidth in case users of the same AER transfer files to each other.

Marked in FIG. 2 are arrows indicating requests for content (dashed line) and content transfer (solid line) for the various scenarios described above. The arrows marked A represent content requests coming from subscribers that are served by the cache found at the local AER if possible. The arrows marked B represent external requests for content found at the subscribers of the operator that served by the first-tier distributed cache system 5. The arrows marked C and D represent requests to local subscribers that were not served by other caches and are attempted to be served from the cache at the serving AER. The arrows marked E represent requests to external parties from local subscribers are attempted to be served from the first-tier system 5, if a second-tier cache T2 returned no hit.

Figure 6:
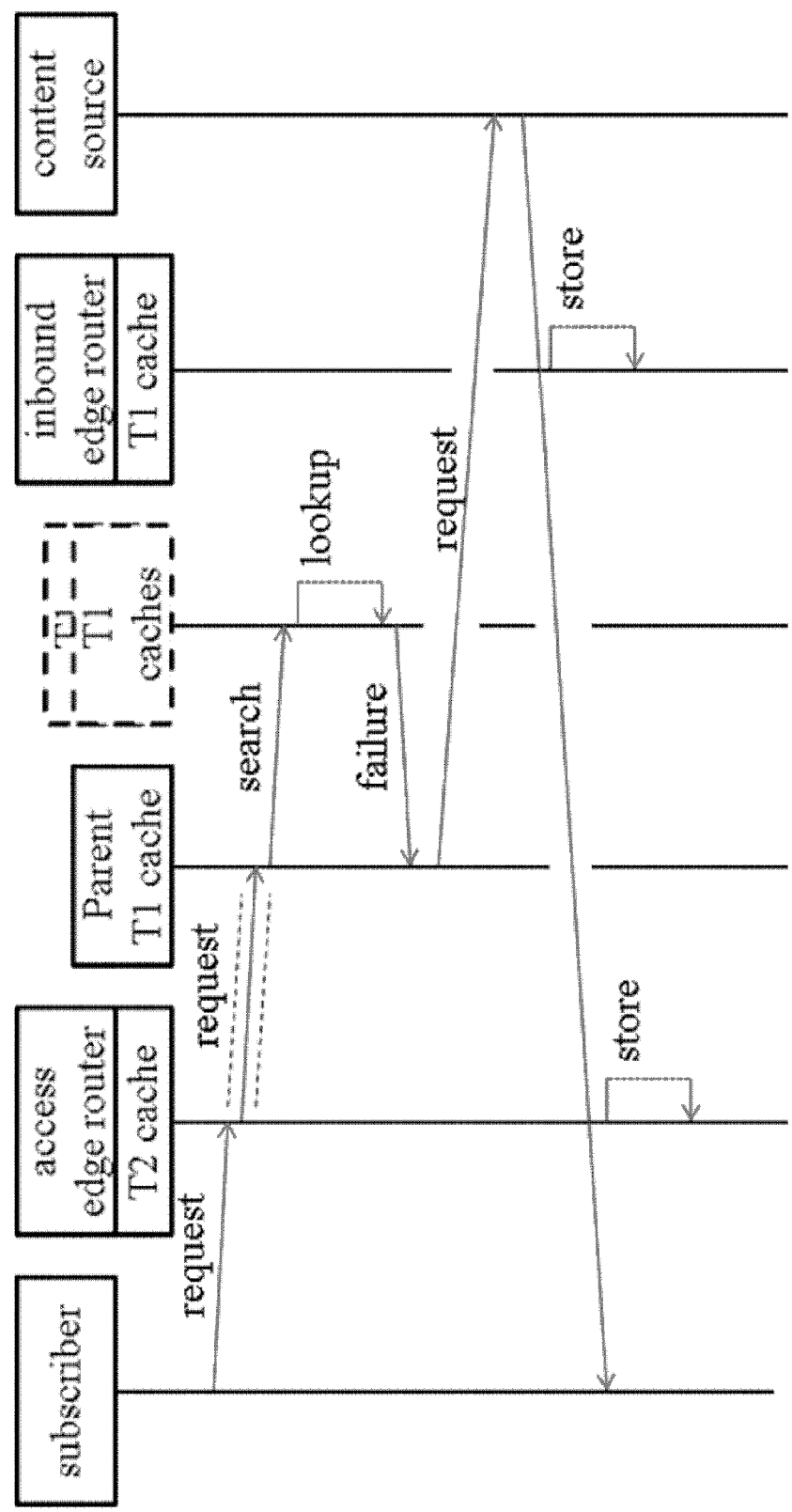
FIG. 6 is a message sequence diagram according to an embodiment of the present invention where external content is requested by a subscriber in a case where the content requested by a subscriber is not found in the caches.

A message flow depicting a scenario when the content requested by a subscriber is not found in the caches can be seen in FIG. 6, which will be self-explanatory based on the above description.

The architecture provides high flexibility in the placement of the caches depending on the specific operator needs. If there are few ERs where most of the Internet traffic would go through and core transport costs are high, these ERs should be equipped with first-tier caches T1, where these caches should hold copies of all important content, if possible.

In a potential future SAE/FMC network, which has few provider (transit) ERs, a number of local ERs and AERs with rented transport for the core network, it is recommended to place first-tier caches T1 at the provider peering points and maybe to a few local/access edge points which is utilized most (has the most subscribers); the rest of AERs can have only second-tier caches T2.

Besides simple caching, i.e. storing content items that passed a cache, some content items are proposed to be forcefully distributed and stored in multiple caches. For this, we propose to employ a system for tracing the popularity of content items. For example, caches follow the frequency of requests for each content item and create a popularity index for them. Using the popularity index, it is possible to provide three popularity ranges as follows:

High popularity items: it is recommended to forcefully distribute such items among all caches of both tiers. Such items should pre-empt lower priority items when a cache is low on storage.

Medium popularity items: it is recommended to forcefully distribute such items at least among all first-tier caches. Such items should pre-empt lower priority items when a cache is low on storage.

Low popularity items: it is recommended to try to store such items in at least one first-tier cache and to try to store them in second-tier caches upon the first request. This is the case described above.

The popularity index defined above can also serve as decision factor for determining the timeout for the different content. Low popularity items should be kept for the shortest time in the cache. This is important especially for the second-tier caches T2 that may have only a limited storage capacity. Besides popularity, other factors may contribute to the content storage decision timeout limit. Examples are: the direction of the request (inbound or outbound, useful e.g., to tune caching based on relative cost on access, core or transit) or source/destination IP address range (useful in specific sites, e.g., site connecting a server on L2 access or having a local peering point).

Figure 7:
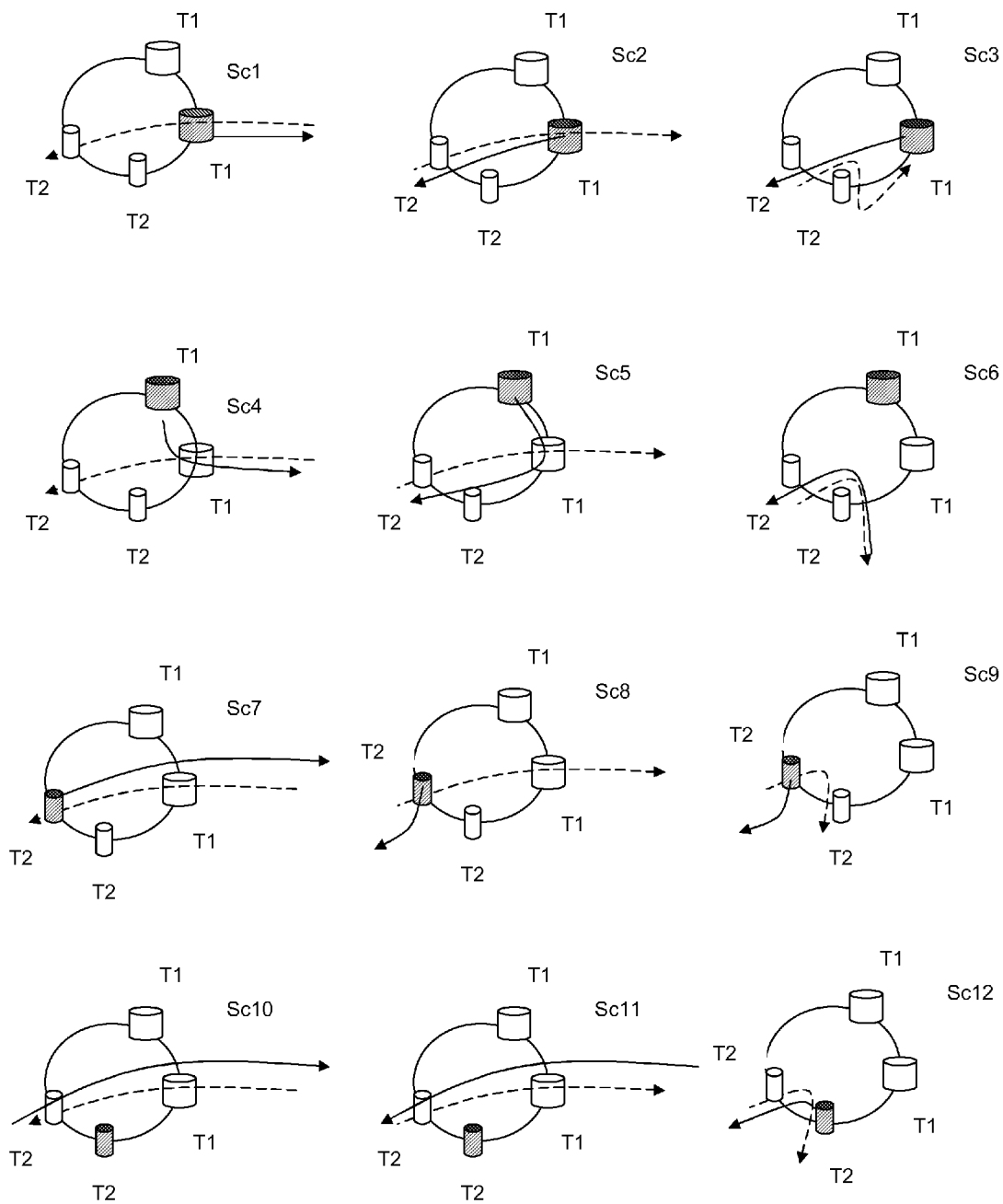
FIG. 7 provides a summary of various scenarios, each scenario relating to a different combination of (a) source/destination of content request; and (b) location of cached content.

FIG. 7 provides a useful summary of various scenarios, each scenario relating to a different combination of (a) source/destination of the content request; and (b) location of cached content. How these various scenarios are handled according to an embodiment of the present invention is summarised in the following table, where e.g. "Sc1" in the table and in FIG. 7 is an abbreviation for "Scenario 1":

|  | Request for internal content from external host | Request for external content from internal host | Request for internal content from internal host |
| --- | --- | --- | --- |
| Requested content stored in T1 of the collocated ER | (Sc1): Serving the request from T1 | (Sc2): Serving the request from T1 | (Sc3): Redirect and pull content from T1 |
| Requested content stored in a T1 of another ER | (Sc4): search and pull content from another T1 and serving the request | (Sc5): search and pull content from another T1 and serving the request | (Sc6): Requesting the destination |
| Requested content stored in the T2 of the AER | (Sc7): Serving the request from T2 | (Sc8): Serving the request from T2 | (Sc9): Serving the request from T2 |
| Requested content stored in a T2 of other AER | (Sc10): VOID | (Sc11): VOID | (Sc12): Serving the request from T2 of other AER |

(VOID: Not possible, since if content is requested from an external host, then the content has been stored in a T1 already.)

An embodiment of the present invention offers one or more of the following advantages.

Transport cost reduction. The main advantage of the invention for the operators is the reduction of overall per-bit transmission costs including peering costs, core network traffic costs and also access transport costs. The flexibility offered by the proposed solution allows efficient application for different types of operators where transport cost is distributed differently among the above components. The solution also adapts efficiently to different traffic distribution (local or external) scenarios.

Scalability. The use of a distributed and two-tier caching solution enables the operator to install lower capacity caches, and also enables load sharing and resilience; as compared to single cache or cache cluster solutions. Furthermore the distribution allows a fine tune of the overall performance of the caching solution by installing cache servers on hotspots of the network. The recommended popularity-based storage functionality allows for best performance for a given capacity of the cache servers. The flexibility and scalability features open up a business opportunity for Ericsson; the second-tier cache server functionality could be implemented into the existing access edge and PDN-GW products (GW: Gateway).

Low CAPEX and OPEX. Due to the ability to use lower capacity and thus lower cost equipment, installation costs are reduced compared to the single caching solutions. From O&M perspective, the solution needs marginal additional costs compared to the existing caching or traffic engineering solutions. While there are more cache servers to operate, a number of second-tier caches needs to be configured in an identical way, therefore automatism becomes possible using scripts.

Improved subscriber experience. The solution is also attractive to subscribers, as it does not regulate traffic, and they also perceive faster downloads thanks to the geographically closer caches.

Use of an embodiment of the present invention would be apparent by utilizing a mobile equipment and a content provider equipment set up outside the operator's network (with limited upload capacity to prolong content download times), and by performing the following steps: (1) placing a unique content on the content server residing outside the operator's network; and attaching a mobile equipment to the operator's network via any of its access networks that is handled by an access edge router equipped with a cache; (2) downloading the content by the mobile equipment from the outside content server; (3) downloading the content again; (4) switching off the mobile equipment and reconnecting to another access edge routers access network (this edge router should also be equipped with a cache); (5) downloading the content again; and (6) downloading the content again. In a network where no caching service is installed, steps 1, 2, 4 and 5 would yield similar download times in this experiment. If a single-cache caching solution is installed in the network, the download times of steps 2, 4 and 5 would be similar, but marginally lower as compared to step 1, where the content was downloaded from the outside server (while in steps 2, 4 and 5 the content was served by the installed cache). If a solution according to an embodiment of the present invention was used, steps 2 and 5 would yield lower times, than measured in step 4, because steps 2 and 5 are served by the second-tier cache, while step 4 is served by the first-tier cache.

It will be appreciated that operation of one or more of the above-described components can be controlled by a program operating on the device or apparatus. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

The invention claimed is:

1. A method of reducing traffic relating to a service provider network comprising a core packet network, a plurality of first access points situated at edge routers which peer the core network to an external packet network, and a plurality of second access points which separate a layer 2 (L2) connectivity network from the core network and which act as an Internet Protocol (IP) point of presence for local subscribers, the method comprising:
providing a cache at each of the access points for caching content passing through the respective access points;
in response to a request received from the external network at any of the first access points for content from a local subscriber;
attempting to serve the request from content previously cached at that first access point or another of the first access points;
if unable to serve the request from any of the first access point caches then attempting to serve the request from content previously cached at the second access point serving the local subscriber; and
if unable to serve the request from that second access point cache then forwarding the request to the local subscriber.

2. A method as claimed in claim 1, further comprising:
in response to a request for content received from a local subscriber at the second access point serving the local subscriber;
attempting to serve the request from content previously cached at that second access point or, in the case of the request being for content from another local subscriber, from content previously cached at the second access point serving the other local subscriber, and
if unable to serve the request from a second access point cache, then attempting to serve the request from content previously cached at one of the first access points, and
if unable to serve the request from a first access point cache then forwarding the request towards the provider of the content.

3. A method of reducing traffic relating to a service provider network comprising a core packet network, a plurality of first access points situated at edge routers which peer the core network to an external packet network, and a plurality of second access points which separate a layer 2 (L2) connectivity network from the core network and which act as an Internet Protocol (IP) point of presence for local subscribers, the method comprising:
providing a cache at each of the access points for caching content passing through the respective access points,
in response to a request for content received from a local subscriber at the second access point serving the local subscriber;
attempting to serve the request from content previously cached at that second access point or, in the case of the request being for content from another local subscriber, from content previously cached at the second access point serving the other local subscriber,
if unable to serve the request from a second access point cache then attempting to serve the request from content previously cached at one of the first access points, and
if unable to serve the request from a first access point cache then forwarding the request towards the provider of the content.

4. A method as claimed in claim 3, wherein each second access point cache is associated with one of the first access point caches, such that a request received at a second access point cache that is unable to be served by that or another second access point cache is attempted to be served from content previously cached at its associated first access point cache.

5. A method as claimed in claim 1, comprising using a tunnel over the core network to forward requests for content between the first and second access point caches.

6. A method as claimed in claim 1, further comprising:
maintaining a record of popularity for various content,
arranging for content within a first predetermined range of popularity to be distributed to the first and second access point caches,
arranging for content within a second predetermined range of popularity lower than the first predetermined range to be distributed to at least to the first access point caches, and
arranging for content within a third predetermined range of popularity lower than the second predetermined range to be distributed to at least one first access point cache.

7. A method as claimed in claim 6, further comprising deciding whether or not to cache content or whether or for how long to maintain content in a cache in dependence upon the measure of popularity.

8. A method as claimed in claim 1, wherein the first access point caches form a distributed cache system, with cached content being shared or searchable across the cache system.

9. A method as claimed in claim 1, wherein the first access points are edge routers and the second access points are access edge routers.

10. A method as claimed in claim 1, wherein the core packet network is a layer 3 packet network, and the second access points provide layer 2 connectivity access into the core network.

11. A method as claimed in claim 1, wherein the service provider network comprises a mobile network.

12. A system for reducing traffic relating to a service provider network, the network comprising a core packet network, a plurality of first access points situated at edge routers which peer the core network to an external packet network, and a plurality of second access points which separate a layer 2 (L2) connectivity network from the core network and which act as an Internet Protocol (IP) point of presence for local subscribers, and the system comprising:
a cache at each of the access points for caching content passing through the respective access points, and
a computer configured, in response to a request received from the external network at any of the first access points for content from a local subscriber, to attempt to serve the request from content previously cached at that first access point or another of the first access points, and if unable to serve the request from any of the first access point caches then to attempt to serve the request from content previously cached at the second access point serving the local subscriber, and if unable to serve the request from that second access point cache then to forward the request to the local subscriber.

13. A system for reducing traffic relating to a service provider network, the network comprising a core packet network, a plurality of first access points situated at edge routers which peer the core network to an external packet network, and a plurality of second access points which separate a layer 2 (L2) connectivity network from the core network and which act as an Internet Protocol (IP) point of presence for local subscribers, and the system comprising:
a cache at each of the access points for caching content passing through the respective access points, and
a computer configure, in response to a request for content received from a local subscriber at the second access point serving the local subscriber, to attempt to serve the request from content previously cached at that second access point or, in the case of the request being for content from another local subscriber, from content previously cached at the second access point serving the other local subscriber, and if unable to serve the request from a second access point cache then to attempt to serve the request from content previously cached at one of the first access points, and if unable to serve the request from a first access point cache then to forward the request towards the provider of the content.

14. An apparatus for reducing traffic relating to a service provider network, the network comprising a core packet network, a plurality of first access points situated at edge which routers peer the core network to an external packet network, and a plurality of second access points which separate a layer 2 (L2) connectivity network from the core network and which act as an Internet Protocol (IP) point of presence for local subscribers, there being provided
a cache at each of the access points for caching content passing through the respective access points, the apparatus being for use at one of the first access points and comprising a computer configured to receive a request from the external network for content from a local subscriber, to attempt to serve the request from content previously cached at the first access point or another of the first access points, and if unable to serve the request from any of the first access point caches to then arrange for the request to be served from content previously cached at the second access point serving the local subscriber.

15. An apparatus for reducing traffic relating to a service provider network, the network comprising a core packet network, a plurality of first access points situated at edge routers which peer the core network to an external packet network, and a plurality of second access points which separate a layer 2 (L2) connectivity network from the core network and which act as an Internet Protocol (IP) point of presence for local subscribers, the apparatus comprising:

a cache at each of the access points for caching content passing through the respective access points, the apparatus being for use at one of the second access points and comprising a computer configured to receive request for content received from a local subscriber, to attempt to serve the request from content previously cached at the second access point or, in the case of the request being for content from another local subscriber, from content previously cached at the second access point serving the other local subscriber, and if unable to serve the request from a second access point cache to then arrange for the request to be served from content previously cached at one of the first access points.

16. A computer program stored in a non-transient computer-readable medium which, when executed by a computer, performs the method of claim 1.

17. A computer program stored in a non-transient computer-readable medium which, when executed by a computer, for controlling an apparatus to performs the method as claimed in of claim 3.

* * * * *